Feb. 16, 1926.

D. M. TERRY

PICTURE TRANSMISSION SYSTEM

Filed Feb. 9, 1925

Inventor:
Donald M. Terry
by E. W. Adams Att'y.

Feb. 16, 1926.

D. M. TERRY

1,573,529

PICTURE TRANSMISSION SYSTEM

Filed Feb. 9, 1925

Inventor:
Donald M. Terry
by E.W. Adams, Atty.

Feb. 16, 1926.

D. M. TERRY 1,573,526

PICTURE TRANSMISSION SYSTEM

Filed Feb. 9, 1925      6 Sheets-Sheet 6

Fig. 6.

Inventor:
Donald M. Terry
            Att'y.

Patented Feb. 16, 1926.

1,573,529

UNITED STATES PATENT OFFICE.

DONALD M. TERRY, OF NEW YORK, N. Y., ASSIGNOR, BY MESNE ASSIGNMENTS, TO WESTERN ELECTRIC COMPANY, INCORPORATED, A CORPORATION OF NEW YORK.

PICTURE-TRANSMISSION SYSTEM.

Application filed February 9, 1925. Serial No. 7,739.

*To all whom it may concern:*

Be it known that I, DONALD M. TERRY, a citizen of the United States of America, residing at New York, in the county of New York and State of New York, have invented certain new and useful Improvements in Picture-Transmission Systems, of which the following is a full, clear, concise, and exact description.

This invention relates to the transmission of pictures by electricity.

Among many known methods and systems for the transmission of pictures by electricity one has proved to be commercially practical for operation over existing long transmission lines. This particular system is especially adapted to existing telephone plant equipment and depends for its satisfactory operation on the transmission of picture characteristics from a sending to a reproducing station as modulations of a voice frequency carrier wave. In this particular system, however, it is essential to the making of faithful reproductions that various adjustments be made, before the actual transmission of the picture characteristics, to determine the proper operating conditions of the apparatus and to ascertain the conditions of the signaling circuit over which transmission is later to take place. Experience with this system has also proved that its operation may be materially facilitated through the use of a method of signaling and telephonic intercommunication between the connected stations.

The principal object of the present invention is the accomplishment of the testing and signaling operations in a simple, practical and expeditious manner.

In accordance with the embodiment shown in the drawing, the invention provides a system of electron discharge devices which are arranged to control the operation of suitable meters during the performance of the required tests and which also respond to the receipt of signals from the distant stations for effecting the operation of a supervisory signal.

This invention is in the nature of an improvement on the system shown and described in a copending application of Horton, Ives and Long, Serial No. 714,466, filed May 19, 1924, and a general reference is hereby made to that application for an understanding of the manner in which the mechanisms of the present system are arranged, and the details are hereinafter mentioned but not particularly illustrated or described.

Figures 1, 7:
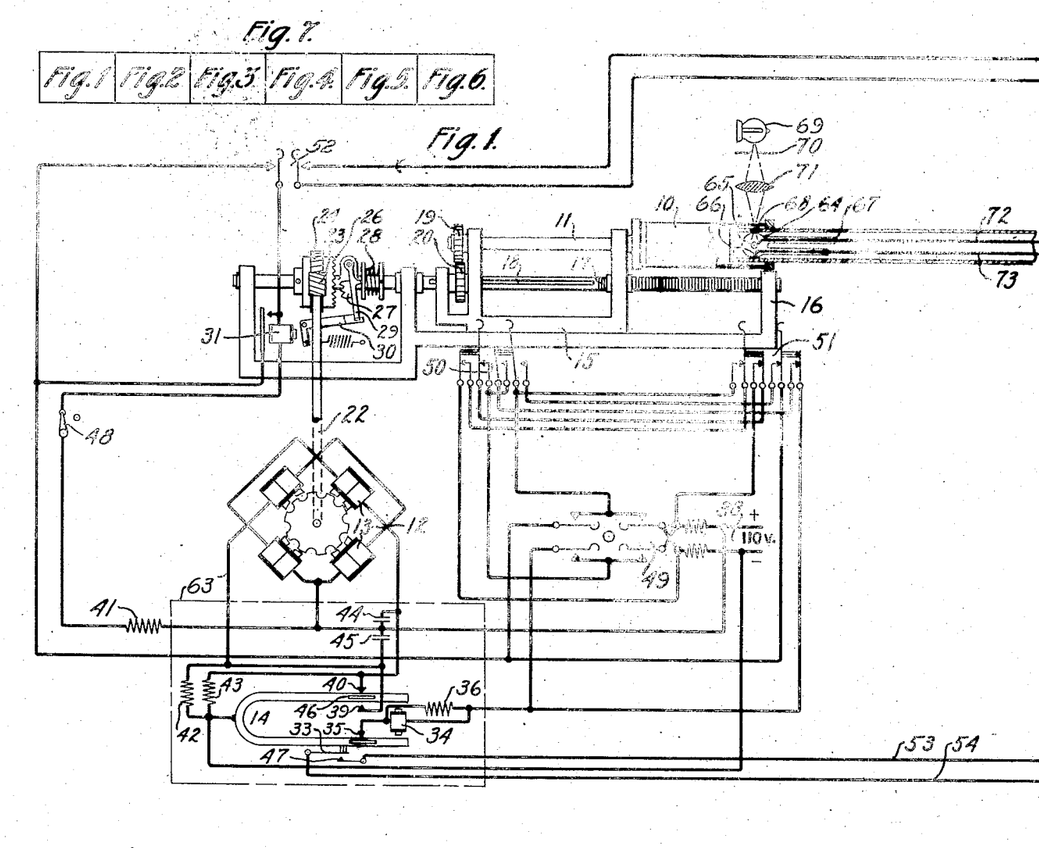

A better understanding of the invention may be had from the following description, when taken in conjunction with the accompanying drawing, which represents the preferred embodiment of the invention. With Figs. 1 to 6 arranged in the manner shown in Fig. 7, a complete picture transmission system embodying the features of this invention, is disclosed.

Coming now to the detailed description of the system, as illustrated in Figs. 1 to 6, a transmitting drum 10, upon which is mounted a transparency of the picture to be transmitted, is rotated and moved axially by a phonic wheel motor 12 which is driven by two pairs of oppositely disposed driving magnets 13. These driving magnets are energized in accordance with the operation of a tuning fork 14. The drum 10 is mounted on the shaft 11 which is carried by a carriage 15 which slides on guides mounted in a stationary frame 16. The carriage 15 is moved along the frame 16 by the rotation of shaft 17 which is threaded for a part of its length and which engages threads in an upright of the carriage 15. The rotation of shaft 17 causes the corresponding rotation of shaft 11 through gears 19 and 20. Gear 20 rotates with the shaft 17 but also slides along this shaft due to a fixed key 18.

Phonic wheel motor 12 communicates its power to shaft 17 through suitable gears 23 and 24 and a suitable clutch. The gear 24 is rotatably mounted on shaft 17 and is positioned by a suitable collar. On one face of the gear 24 is a toothed wheel or gear 26 which is arranged to be meshed with a toothed sector 27 which is normally spring-pressed by spring 28 but which is prevented from engaging the teeth in the gear 26 due to the position of a stop member 30 engaging arm 29 carrying the toothed sector 27. The stop member 30 is controlled by a release magnet 31. The energization of magnet 31 attracts its armature and removes the stop member 30 from engagement with arm 29, thereby permitting the engagement of the toothed sector 27 with the teeth in the gear 26, and forming a semi-positive clutch between the gear 24 and the shaft 17 to which the member 29 is secured. Power is thus imparted to the shaft 17 for causing the rotation and axial movement of the drum 10.

The tuning fork 14 is driven by a magnet 34 by current from a power source, not shown, connected to switch 49. The driving magnet circuit is intermittently interrupted at contact 35. Connected across the magnet 34 is a spark killer resistance 36. The phonic wheel motor 12 is also driven by power from the power source, not shown, through contacts 39 and 40. A resistance 41 is connected in series with the clutch magnet 31 and serves to regulate the current therein. A spark killing circuit consisting of resistances 42 and 43 and condensers 44 and 45 is associated with contacts 39 and 40 for eliminating the sparking action at these contacts. Contact spring 33 carried by the tuning fork 14, but insulated therefrom, and contact 47 are connected through conductors 53 and 54 to the synchronizing carrier wave oscillator shown in Fig. 2.

The energizing circuit of the release magnet 31 extends through the main switch 48, the control switch 49 and the stop switches 50 and 51. When the switch 49 is thrown to the left, part of stop switches 50 and 51 are affected for opening the circuit of the release magnet 31 as well as the driving magnet 34 of the tuning fork 14, for stopping the respective actions. With the switch 49 in its right hand position, the other half of stop switches 50 and 51 are affected for performing a similar function when the drum 10 is moving in the opposite direction. In this connection, it should be noted that stop switches 50 and 51 are each provided with a multiplicity of contacts, two arms being provided for each switch, one just ahead of the other. The two arms of each of these switches are provided not only for the purpose of opening the circuit of the release magnet 31 when the picture drum 10 has reached the end of its travel or the transmission of the picture, but to also provide against the possibility of the operator failing to reverse the direction of the motor, thereby driving the motor for moving the drum 10 in the opposite direction. The second set of switch contacts is provided for opening the circuit of the release magnet 31 and the operating circuit of the driving magnet 34 in the event that the carriage moves in the wrong direction.

In order to prevent interference from the tuning fork 14, this fork together with the associated spark killers is enclosed in a copper shield 63.

Mounted within the drum 10 is a photoelectric cell 64. This cell consists of a glass container, within which is mounted a metal anode 65, in the shape of a ring, and a potassium cathode 66. The cathode consists of a potassium coating on the inside of a glass receptacle, which coating also covers a corrugated metallic plate which serves as a terminal conductor. A glass extension 67 is provided to facilitate the forming of the cathode without having connection with the anode 66. A small clear glass window 68 is provided in the cathode to allow the entrance of light from an illuminating source 69. An image of an aperture in the screen 70 which is intensely illuminated by light from source 69 is projected by lens 71 upon the surface of the drum 10 to illuminate an elemental area thereof. The tone value of the elemental area determines the amount of light impressed upon the cathode of the photo-electric cell 64, and in this way the current passing through this photoelectric cell is determined by the tone value of the picture to be transmitted.

The electrodes of the photoelectric cell 64 are connected to a picture amplifier PCA, Fig. 2, by conductors 72 and 73 through a double pole double throw switch 100.

The picture current amplifier PCA consists of two electron discharge devices 105 and 106 each of the three element type. The filaments of the devices 105 and 106 are heated from batteries 107 and 108 respectively, although obviously a common battery could be provided for supplying the heating current for these filaments. The photoelectric cell 64 is connected to the input circuit of the electron discharge device 105 through a source of potential 103 and a resistance 104. Static polarizing potential for device 105 is supplied through resistance 110' connected in the filament circuit thereof. The source of potential 103 is divided into three sections 110, 111, and 112. Section 110 is made up of large steps of battery the terminals of which are connected to the switch points of a multi-contact switch 113. Section 111 is made up of smaller gradations of batteries the terminals of which are similarly connected to contact points of a switch 114. Section 112 consists of a potentiometer 115 connected in series with battery 112 and a resistance 116 for making finer adjustments of the applied voltage. Switches 113 and 114 are provided in double arms with resistances 117 and 118, respectively, connected between the switch arms so as to allow the connection of any number of available batteries in series without opening the main circuit or short circuiting any of the batteries. Switch 100 is provided for permitting the reversal of the polarity of the battery so that pictures may be transmitted and a positive or negative reproduced from a positive.

Connected in the output circuit of the device 105 is a battery 120, resistance 121 and an ammeter 122. The input circuit of the device 106 is connected to an intermediate point of the battery 120. The grid electrode of the device 106 is given a static biasing potential by means of potentiometer 123 connected across a battery 124, the circuit of which is controlled by means of a switch 125 and by means of the associated batteries. Connected in the output circuit of the tube 106 is a battery 127, a resistance 128, and an ammeter 129.

The picture current modulator PM comprises an electron discharge device 131 of the three-element type. The grid electrode of this device is connected with a biasing potential through a potentiometer 132 which is connected across battery 134 through a resistance 133 and the associated batteries. Switch 135 when thrown to the right closes the potentiometer circuit at contacts 136 and 137 and connects the input circuit of the modulator PM to the output circuit of the device 106 which forms a part of the picture current amplifier PCA. With the switch 135 in the right hand position, the biasing potential is changed to facilitate the adjustment of the current prior to the transmission of the picture. When the switch 135 is thrown to the left, the circuit of the potentiometer 132 is connected in series with the input circuit of the picture modulator PM at contact 139. The picture carrier wave oscillator circuit is connected to the input circuit of the picture modulator PM through a suitable transformer 140 which has connected across its secondary winding a resistance 141. There is connected in the output circuit of the electron discharge device 131 the primary winding of a transformer 143, an ammeter 142 and a battery 144.

Associable with the picture modulator PM is a picture oscillator PO which consists of an electron discharge device 150 of the three-element type. The filament of the device 150 is heated from battery 151 while the plate current for this device is supplied from battery 152 through a suitable choke coil 153. Also connected in the output circuit of the device 150 is a resistance 154 and a potentiometer 155. A feed-back circuit for the device 150 is provided through resistance 156 and transformer 157. The frequency of the generated carrier wave is determined by a condenser 158 which is connected in the primary circuit of the transformer 157. A biasing potential for the grid electrode of the device 150 is supplied from a battery 159 connected to the secondary winding of the transformer 157. Condenser 161 is connected in the output circuit of the device 150 and serves as a blocking condenser to prevent current from battery 152 from affecting transformer 157.

Picture oscillator PO is connected to the picture modulator PM through a shielded transformer 160 and the contacts of a switch 163 which may be operated for disconnecting the picture oscillator from the picture modulator and connecting the same directly to contact 201 of key 200. The picture oscillator may be connected either to the picture filter or the test and signal detector depending on the position of key 200. Connected in bridge of this circuit is a resistance 202 serving to stabilize the action of the current on the electron discharge devices.

The synchronizing carrier wave controlling the operation of the tuning fork at the receiving station, is supplied by an oscillator SO which consists of an electron discharge device 170, the filament of which is heated from a battery 171. Plate current for the device 170 is supplied from a battery 172 through a suitable choke coil 173. The generated wave is supplied to a modulator circuit 174 through a resistance 175 and a transformer 176. As described in connection with the picture oscillator PO, a similar feed-back circuit is provided for the electron discharge device 170 consisting of a resistance 177 and a transformer 178. The frequency of the generated wave is similarly controlled by means of a condenser 179 connected in the primary circuit of the transformer 178. In order to prevent current from the battery 172 reaching the transformer 178, a stopping condenser 181 is connected in the output circuit of the device 170. The synchronizing carrier wave transmitted to the line is controlled by contact 33 of the tuning fork 14 through conductors 53 and 54, and in this way the frequency of the synchronizing carrier wave is determined by the operation of the tuning fork 14 which serves as a pace setting device for the transmission of the synchronizing carrier wave.

The secondary winding of the transformer 143 is connected to the picture channel filter 166 through switch 163 and contacts of a multi-contact key 200 and from thence the signals are transmitted through a suitable amplifier to the line. The output circuit of the synchronizing oscillator SO is connected to a control channel filter 183 which is connected in parallel with the output circuit of the picture channel filter 166. From this point, the picture carrier wave and the synchronizing carrier wave appear in the same circuit and are simultaneously impressed on the amplifier TA.

Figure 3:
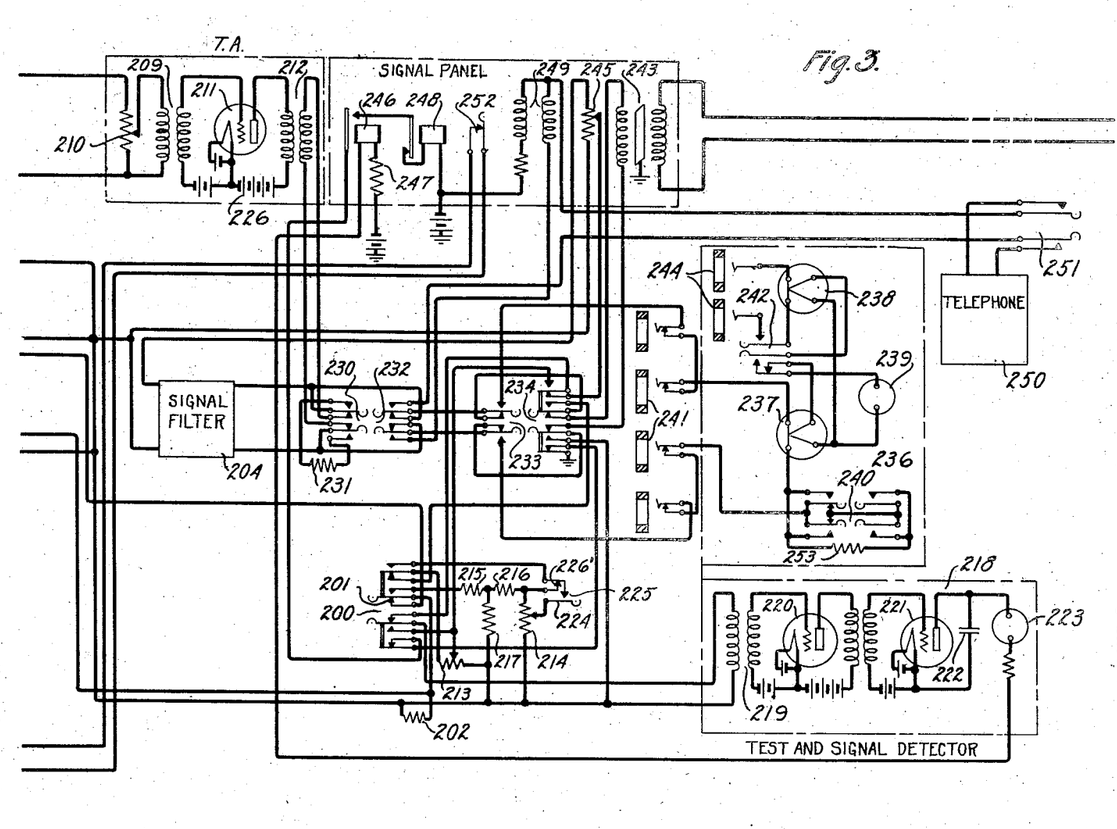
Figure 4:
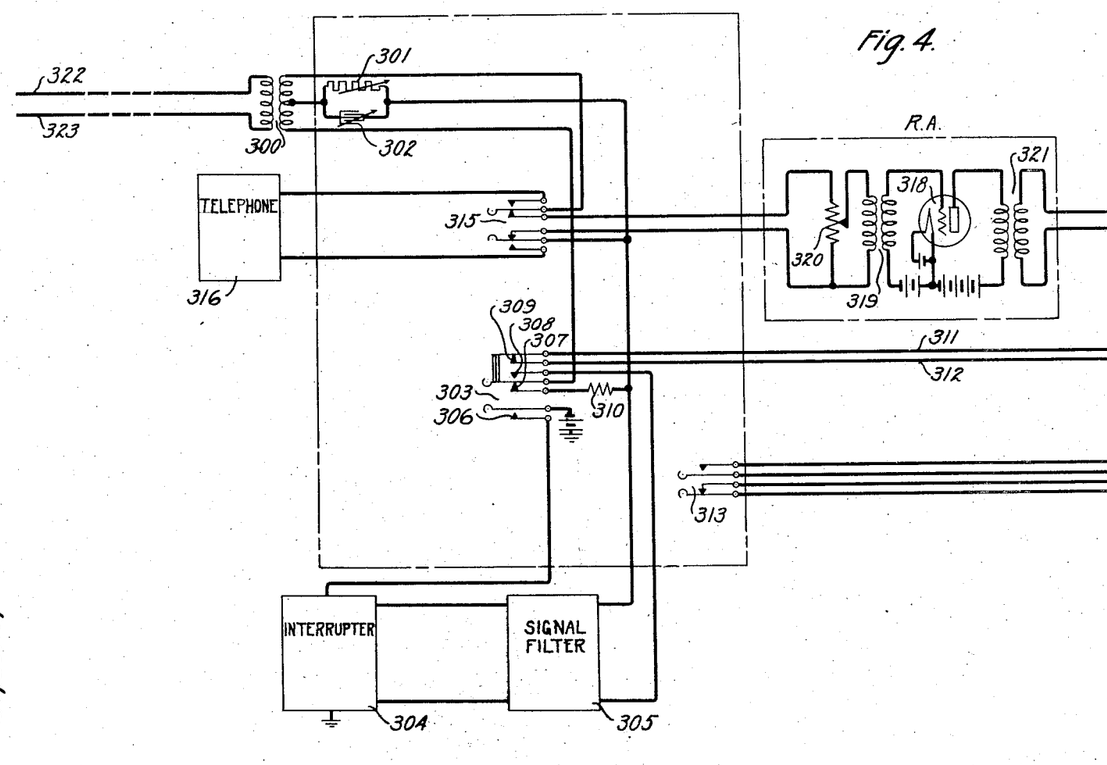
Figure 5:
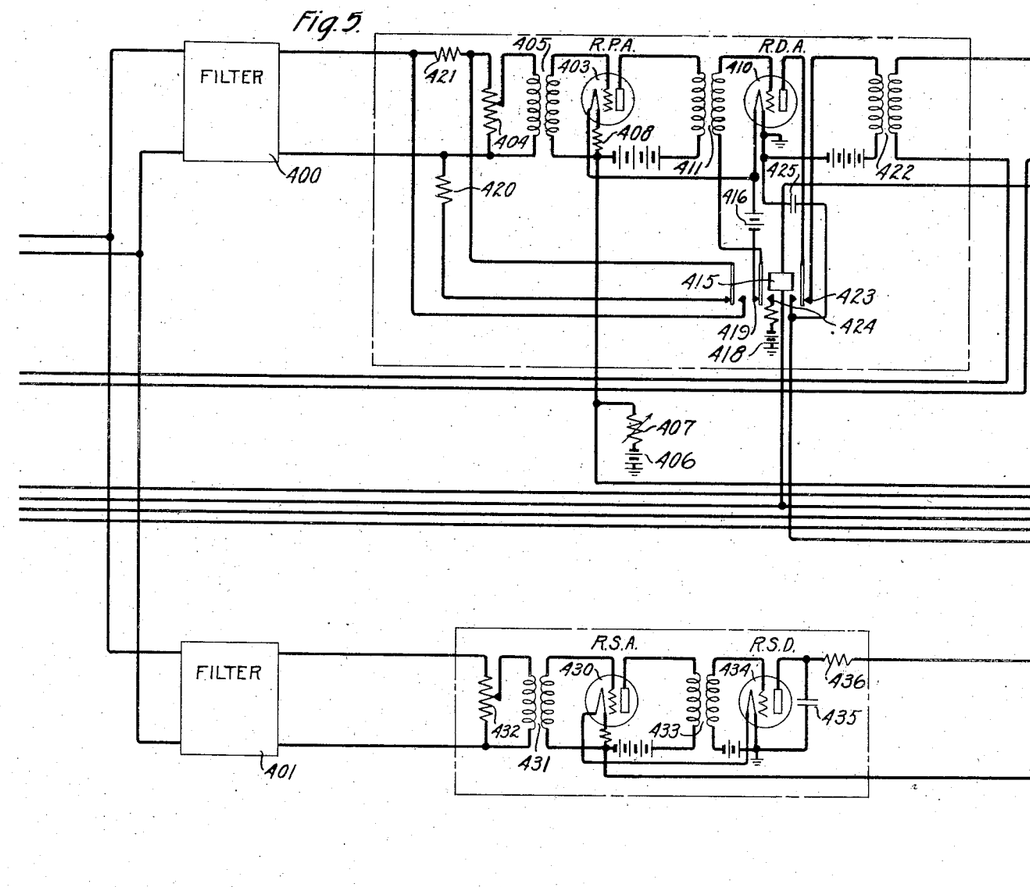
Figure 6:
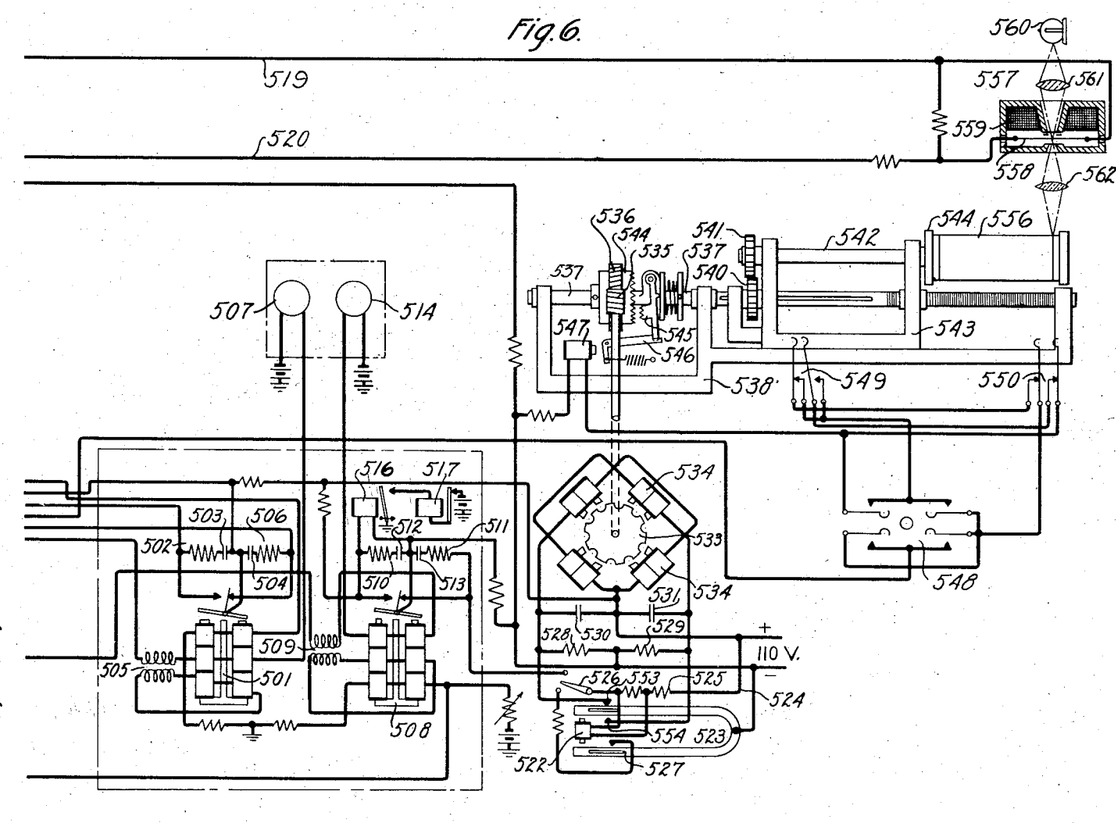

Referring now to Fig. 3, the amplifier TA and the test and signal detector 218 and their associated circuits will now be described. The amplifier TA is connected with the conductors 184 and 185 leading from the picture and control channel filters 166 and 183, respectively, through a transformer 209 which has connected in its primary circuit a potentiometer 210. The secondary circuit of the transformer 209 is connected to the input circuit of an electron discharge device 211. The output circuit of the electron discharge device includes the primary winding of a transformer 212 and a battery 226. The secondary winding of the transformer 212 is connected through normally closed contacts of switches 230, 232, 233 and 234 to the primary winding of a transformer 243, the secondary winding of which is connected to the line conductors 322 and 423 extending to the distant station where picture receiving and reproducing apparatus is located.

The test and signal detector 218 comprises two three-electrode electron discharge devices 220 and 221 with their associated circuits. The device 220 is connected to contacts of key 200 through a suitable transformer 219. Similarly, the output circuit of the device 220 is connected with the input circuit of the device 221 through a transformer. Connected in the output circuit of the device 221 is a condenser 222 and an ammeter 223 with associated resistance. Connected in a circuit common to the output circuit of the device 221 is a relay 246 and a resistance 247. Relay 246 controls a buzzer 248. The buzzer 248 is operated only upon the receipt from the distant station of a predetermined current frequency for apprising the operator at the sending station that the distant operator desires to signal or communicate with him telephonically and serves by means of code signals to convey certain information to the transmitting operator. It is thus seen that the test and signal detector 218 functions as a detector of signals received from the distant station for causing predetermined operations. It is also made use of for test purposes, being connected to the contacts of key 200 which, when in its actuated position, connects the potentiometers 213 and 214 through resistance pads 215, 216 and 217 with the output circuit of the picture modulator PM. The resistances 215, 216 and 217 simulate the impedance of the picture filter, thus facilitating the test operations. The potentiometer 214 is for the purpose of adjusting the carrier current wave for the light and dark conditions. In other words, this potentiometer determines the contrast between the light and dark shades of the picture. With the key 200 operated, the test and signal detector 218 is connected to the output circuit of the modulator PM. Potentiometer 214 is first set with an opaque screen between the light source and the photoelectric cell 64 to a point to give the desired contrast and then switch 224 is operated opening contact 226 and closing contact 225. The potentiometer 213 is then set to give the desired reading on the ammeter 223. The switch 224 is now operated for opening contact 225 and closing contact 226′ thereby reducing the loss introduced by potentiometer 214 by an amount equal to the desired contrast. A clear film is also substituted for the opaque screen. The sections 113, 11 and 114 are then adjusted to produce the same reading, as before, of the ammeter 223. In this way, adjustments may be made to vary the contrast between the light and dark portions of the picture.

To test the picture oscillator, switch 163 and key 200 are operated to connect the entire secondary winding of transformer 160 with the test and signal detector 218. By watching the ammeter 223, the reading of which may be controlled by potentiometer 213, the variations in the amount of current generated by the picture oscillator may be determined.

When it is desired to make line tests switch 230 may be operated to terminate the line in a predetermined impedance. Key 230 opens at its inner contacts the secondary circuit of the transformer 212 of the amplifier TA and closes at its outer contacts a circuit, including the resistance 231, the impedance of which is selected so as to be substantially of the same value as the impedance of the line when associated with the connecting circuits. With the resistance 231 substituted for the amplifier TA, various tests may be made from the receiving station or any other point along the line to determine the operating conditions of the line.

Key 233 serves to disconnect the apparatus and circuits to the right thereof and connects tests or meter panel 236 to the output circuit of the amplifier TA. The test or meter panel 236 comprises a pair of thermocouples 237 and 238 which are connected to an ammeter 239. The effectiveness of the thermocouples is controlled by means of a key 240 which inserts a resistance 253 in circuit with the heating element of thermocouple 237. Thermocouple 237 is connected to ammeter 239 when key 240 is operated in either direction. When it is desired to connect the ammeter 239 to thermocouple 238, switch 242 is operated to accomplish this feature. With the thermocouple connected to the output circuit of the amplifier TA through key 233, various tests may be made to determine the transmission efficiency of the system. It may also be desired to connect the test or meter panel 236 with various other parts of the system. In order to permit the association of the test or meter panel 236 with various parts of the system, the elements of the thermocouples terminate in contacts of jacks 241 and 244 which, by means of plugs and cords, may be extended to any desired point.

For the purpose of making tests on the stability of the system key 234 is arranged for disconnecting the primary winding of the transformer 243 and connecting the part of the system to the left of this point with the test and signal detector 218 through the normally closed contacts of key 260. With these connections complete, the system may be tested up to the point of the transmission of the carrier current waves to the transformer 243. It should also be noted that, upon the operation of key 234, the circuit for buzzer 248 through the contacts of relay 246 is opened at the lower contact of this key, thereby preventing the operation of the interrupter in the event that relay 246 operates.

Key 232, when operated, disconnects the amplifier TA from the line and connects thereto inductances 249 which are included in a circuit extending to the contacts of a key 251 which functions to connect a telephone set 250 therewith. When keys 232 and 251 are actuated, telephone communication may be carried on between the connected stations over the same circuit that is utilized for transmitting the picture carrier wave.

The amplified current from the amplifier TA passes through the transformer 243 over the line conductors 322 and 323 to the receiving or reproducing station where the line conductors terminate in the primary winding of a transformer 300. According to the preferred form of the invention, the secondary winding of the transformer 300 is connected as a hybrid coil for permitting the transmission of currents in both directions. Connected with the mid-tap of the secondary winding of the transformer 300 is an adjustable resistance 301 and an adjustable condenser 302. These units are adjusted to balance the line so that incoming and outgoing currents divide properly between the various branches. One of the outside terminals of the secondary winding of transformer 300, the common branch of the resistance 301 and condenser 302 opposite the connection to the transformer 300, are connected through the inner contacts of a key 315 to the input circuit of a receiving amplifier RA. This amplifier consists of a three-element electron discharge device 318 which has its input circuit connected to the circuit extending from the secondary winding of the transformer 300 by means of a transformer 319. Connected in the primary circuit of the transformer 319 is a potentiometer 320 for adjusting the current impressed on the input circuit of the electron discharge device 318.

For the purpose of apprising the operator at the distant transmitting station that the operator at the receiving station desires to communicate with him telephonically or to convey other information by means of code signals as previously agreed to, a key 303 for associating an interrupter 304 through a signal filter 305 is provided. The interrupter 304 has been shown diagrammatically, since the interrupter per se does not form a part of the present invention, for obviously any one of several types of interrupters could be used with equally good results. When the key 303 is actuated, the interrupter 304 is set in operation due to the connection of a battery through contact 306 therewith for transmitting through the signal filter 305, contact 308 of the key 303 over the line conductors 322 and 323 to the distant transmitting station, a current wave which is allowed to pass only through the signal filter 204, from whence it is impressed on the input circuit of the test and signal detector 218 where it is effective to cause the operation of relay 246 and the operation of buzzer 248. It should be noted that signaling between the two stations may be accomplished at any time during the operation of the system, that is, during the transmission of pictures. In other words, the present form of signaling may be utilized for interrupting the transmission of the picture should the receiving operator detect some fault or irregularity in the transmission of the picture without permitting its complete transmission and then informing the transmitting operator of the difficulties encountered. A key 315 is provided for connecting a telephone 316 with the line conductors 322 and 323 through the transformer 300, at the same time disconnecting the receiving amplifier RA.

The output circuit of the electron discharge device 318 is connected with a common circuit including filters 400 and 401 by means of a transformer 321. Filters 400 and 401 are similar to filters 166 and 183. The respective filters pass only the designated carrier current waves. In other words, filter 400 passes the carrier current wave modulated in accordance with the picture characteristics while filter 401 allows only the synchronizing carrier wave to pass.

The carrier current wave passed by filter 400 is impressed on the input circuit of a receiver picture amplifier RPA which consists of an electron discharge device 403. The electron discharge device 403 is connected with the filter 400 through a transformer 405, the primary circuit of which has connected therein a potentiometer 404. The amplified carrier wave is either amplified or detected in a receiving detector amplifier RDA accordingly as to whether it is required to control the operation of a light valve or the starting of the receiving picture drum.

The reproducing amplifier detector RDA consisting of an electron discharge device 410, has its input circuit connected with the output circuit of the device 403 through a transformer 411. The filaments of the electron discharge devices 403 and 410 are heated by current from a battery 406 through an adjustable resistance 407. Corresponding changes in the bias of these two electron discharge devices may therefore be made through a single adjustment which has been found to improve the operation of the system. A static polarizing potential for the electron discharge device 403 is furnished from a resistance 408 in series with the filament of device 403.

For picture reproduction, the reproducing picture amplifier RDA functions as an amplifier, while for starting or releasing the reproducing mechanism, it functions as a detector. When device 410 is functioning as an amplifier, the grid electrode thereof is polarized by battery 416, the circuit of which is closed through contact 419, of relay 415. When functioning as a detector, the grid is maintained at a larger negative potential by the addition of battery 418 which is connected upon the operation of relay 415 through contact 424. A by-pass condenser 425 is connected in the plate circuit of the device 410 upon the operation of relay 415, thereby providing a low impedance path for the picture carrier wave. The plate electrode of the device 410 is connected to the primary winding of the transformer 422 through the normally closed contact 423 of relay 415.

If relay 415 is energized either by the closure of switch 313 or the closure of the left hand contact of relay 501, battery 418 is substituted for battery 416 thereby sufficiently biasing the device 410 for effecting its operation as a detector. If the carrier wave is incoming from the distant station, detected current in the output circuit of the receiving detector amplifier RDA will cause the operation of relay 501. This relay has three windings, the middle one being connected to the primary winding of a transformer 505, which has one terminal connected directly to the right hand front contact of relay 415, while the other terminal is connected to the middle winding of this relay. The lower winding has included in its circuit the secondary winding of the transformer 505. Thus, when a carrier wave is detected by the electron discharge device 410, an impulse passes through the primary winding of transformer 505 and the middle winding of relay 501. Simultaneously therewith, a current is induced into the secondary winding of the transformer 505 which acts on the lower winding of the relay to accelerate the movement of the relay armature to its other contact. It should be noted also that the upper winding of the relay 501 serves as a biasing winding for returning the relay armature to its other position. Biasing current for this relay is supplied by battery 406 through adjustable resistance 407. It will be remembered that battery 406 also furnished the heating current for the filaments of electron discharge devices 403 and 410. By having the heating current for the devices 403 and 410 and the biasing current for relay 501 supplied from a common battery through an adjustable resistance 407, the bias of the relay 501 is accurately set when the current supplied to the filaments is at its normal value, thereby simplifying the operation of the apparatus. The contacts of the relay 501 are bridged by resistances 502 and 506 and condensers 503 and 504 for eliminating the sparking action at the contacts of this relay. There is also connected in circuit with the middle winding of this relay an ammeter 507 serving to indicate the current passing through this part of the circuit.

The synchronizing current wave passed by the filter 401 is amplified in reproducing synchronizing amplifier RSA and detected in reproducing signal detector RSD. The amplifier consists of an electron discharge device 430 which is coupled with the filter 401 by means of a transformer 431. As in the case of the electron discharge device 403, a potentiometer 432 is connected in the primary circuit of the transformer 431 for controlling the current applied thereto. The output circuit of the electron discharge device 430 is connected by means of a transformer 433 to the input circuit of an electron discharge device 434 forming a part of the receiving signal detector RSD. Static biasing potential for device 430 is supplied by a resistance connected in the filament circuit. The output circuit of the device 430 includes a by-pass condenser 435 and a resistance 436 which is connected to the upper winding of relay 508. Like relay 501, one winding of relay 508 is controlled by current induced in the secondary winding of a transformer 509, the primary circuit of which is connected with the resistance 436 and in turn the output circuit of the device 434. Biasing current for the relay 508 is supplied in a manner similar to that described for the electron discharge devices 403 and 410. Bridged across the contacts of relay 508 are resistances 510 and 511 and condensers 512 and 513 for eliminating sparking. An ammeter 514 is connected in circuit with the winding of relay 508 for ascertaining the current flowing through the connected winding.

Relay 508 controls through its contacts the operation of a tuning fork 523 which controls the rotation of a phonic wheel motor 533. There is also connected with the left hand contact of relay 508 the winding of relay 516 which controls through its contacts the operation of a buzzer 517. Relay 516 is slow releasing and is normally energized and therefore buzzer 517 is normally quiet, but should relay 508 be operated to engage its left hand contact for an appreciable period of time, the winding of relay 516 is short circuited causing the release of this relay and the operation of the buzzer 517 which communicates certain information to the receiving operator from the transmitting operator, as will later be more fully described.

With switch 526 engaging its upper contact, a circuit is completed between the contacts of relay 508 and the winding of electromagnet 522 which drives the tuning fork 523.

The tuning fork 523 may also be driven independently of the contacts of relay 508 by closing switch 526 in its lower position so that the energizing circuit of magnet 522 extends through contact 527. The phonic wheel motor 533 is driven through the action of diametrically disposed magnets 534 which are connected to contacts 553 and 554 controlled by the tuning fork 523. Connected with the contacts 553 and 554 are resistances 528 and 529 and condensers 530 and 531, serving to reduce the sparking action at the connected contacts.

The phonic wheel motor 533 has its shaft connected through a worm gear 535 to a gear wheel 536 rotatably mounted on a shaft 537. Power from the gear 536 is imparted to shaft 537 which is threaded for a portion of its length and which has slidably mounted thereon a gear 540 through a clutch mechanism consisting of a toothed wheel 544 and a toothed sector 545. The former is connected to gear 536 while the latter is fixed to the shaft 537 and is normally spring-pressed, but is prevented from engaging wheel 544 due to a stop 546. The stop 546 is controlled by a release magnet 547 which in turn is controlled by relay 501 through the contacts of switch 548 and stop switches 549 and 550. The shaft 537 is fitted in a carriage 543 which slides in guides formed in a stationary carriage 538. The gear 540 is meshed with the teeth of a gear 541 which is secured to a shaft 542 on which the reproducing drum 544 is secured. Stop switches 549 and 550 serve the same purpose as similar switches described in connection with the transmitting mechanism.

The output circuit of the receiver detector amplifier RDA is connected with a light valve 557 through a transformer 422 which has its secondary winding connected to the light valve by conductors 519 and 520. The light valve 557 comprises a single string 558 which is suspended in a magnetic field of constant strength maintained by current in winding 559. The string 558 controls the amount of light impressed on a photo-sensitive surface 556 secured to the drum 544 from a light source 560 through suitable lenses 561 and 562. For further details of the operation and construction of the light valve, reference should be had to a copending application of H. E. Ives, Serial No. 711,755, filed May 9, 1924.

A description of the transmission of a picture and the operations incident thereto will now be given. With key 48, Fig. 1, in its normal position, the circuit for clutch magnet 31 is open, thereby preventing the energization of this magnet even should key 49 be closed. However, with the key 49 actuated, a circuit for the clutch magnet 31 is extended to the contacts of start key 49. By the closure of key 313, Fig. 4, relay 415 is energized to convert the reproducing detector amplifier RDA from an amplifier to a detector. When this relay operates, a resistance 420, which is normally in bridge of the primary circuit of transformer 405 is disconnected while the serial resistance 421 is short circuited, thus facilitating the operation of the discharge devices 403 and 410. The detected incoming carrier wave then energizes relay 501 to maintain relay 415 energized independently of key 313. The energization of relay 501 opens the circuit of clutch magnet 547 at its right hand contact, thereby preventing the energization of this magnet. With switch 49 thrown to its left hand position and key 52 actuated, clutch magnet 31 is energized over a circuit including the contacts of key 49 and the contacts of stop switches 50 and 51. The energization of clutch magnet 31 withdraws the stop 30 from engagement with the arm 29, allowing the toothed sector 27 to engage the gear wheel 26, thereby causing the rotation of drum 10 upon which is mounted a transparency of the picture to be transmitted.

The carrier wave from the oscillator PO is interrupted due to the closure of the right hand contact of key 52. The interruption of the carrier wave causes the deenergization of relay 501 to engage its right hand contact. With the switch 548 in its left hand position, a circuit is completed including the winding of clutch magnet 547 with the terminals of an operating battery.

The deenergization of relay 501 also opens the holding circuit for relay 415 causing the deenergization of this relay and the conversion of the receiving detector amplifier RDA to an amplifier. With switch 52 in its normal position, the carrier wave from oscillator PO is impressed upon the modulator PM through the transformer 140. The output circuit of the modulator is connected by means of a transformer 143 to the picture channel filter 166, and thence by way of the amplifier TA to the line conductors 322 and 323 through transformer 243. Since the drum 10 is rotating, the carrier wave is modulated by picture current corresponding to the tone value of density of the elemental areas of the picture and is transmitted to the reproducing terminal and impressed on the light valve 557 to effect the exposure of the photo-sensitive surface 556.

In order to permit the receiving operator to signal and communicate with the transmitting operator over the same circuit as the modulated picture carrier waves are transmitted, the interrupter 304 is arranged to be connected with the line conductors 322 and 323 upon the actuation of key 303. The current wave impressed on the conductors 322 and 323 through transformer 300 is received at the transmitting station and pass through transformer 243. The characteristic of the signal filter 204 is such that it passes only the carrier wave generated by the interrupter 304. The carrier wave passed by the filter 204 is impressed through the potentiometer 245 and the upper and lower contacts of key 234 and the contacts of key 200 on the test and signal detector 218. The impressed carrier wave is detected and impressed on relay 246 causing the energization of this relay. Relay 246 in operating energizes relay 248 which acts as a buzzer and which gives an audible signal to the transmitting operator. The transmitting operator may then communicate with the receiving operator telephonically by actuating keys 232 and 251 provided the receiving operator has actuated a similar key 315. Each of these keys connects a telephone set with the connecting circuit after which the operators may communicate with each other. The circuits are so arranged that it is not necessary for the receiving operator to await the completion of the transmission of the picture before signaling the transmitting operator. In other words, the receiving operator may effect the operation of the buzzer 248 during the transmission of the picture or at any other time.

The transmitting operator may also desire to signal the receiving operator. This particular feature is accomplished through the location of a key 252 in circuit with the output circuit of the synchronizing oscillator SO. When this key is operated, the modulating circuit through the tuning fork contacts 33 and 47 is interrupted, transmitting a continuous carrier wave thereby causing relay 508 to operate to its right hand contact for a time dependent upon the time during which key 252 is actuated for short circuiting the winding of relay 516. Relay 516 releases its armature, closing the circuit for buzzer 517. Buzzer 517 gives an audible signal to the receiving operator who may then actuate key 315 for associating telephone set 316 with the line conductors 322 and 323. The transmitting operator may, by operating keys 232 and 251, now communicate telephonically with the receiving operator over the same circuit as that over which the modulated picture carrier wave and the synchronizing carrier wave are transmitted.

The method of operation will now be described. The picture drums 10 and 544 at the transmitting and receiving stations respectively are set at a starting position in any suitable manner which, under ordinary conditions, will be in this position. The transparency of the picture to be transmitted is secured to the drum 10, while the photo-sensitive surface or film 556 is mounted on the drum 544. Switch 48 being closed, key 49 is actuated to the left, whereby the energizing circuit for the release magnet 31 is extended to the contacts of start key 52. At the reproducing terminal, switch 548 is kept open for preventing the premature energization of clutch magnet 547.

Synchronizing carrier waves from the oscillator SO in accordance with the vibration of tuning fork 14 are transmitted through modulator circuit 174, control channel filter 183, amplifier TA, transformer 243, the line conductors 322 and 323 to the reproducing or receiving station, from whence they pass through transformer 300, the filter 401 and are impressed on the receiving signal amplifier and receiving signal detector RSA and RSD. Picture carrier wave is supplied by oscillator PO to modulator PM by way of transformer 140 and transmitted through filter 166, amplifier TA, and transformer 243 to line conductors 322 and 323. The carrier wave received at the reproducing or receiving station passes through the receiving amplifier RA and the filter 400 and impressed on the reproducing picture amplifier and reproducing picture detector RPA, and RDA before being impressed on the light valve 557.

With the picture carrier wave impressed on the line at the transmitting station, key 313 is actuated long enough to permit the energization and locking up of relay 415 which converts the amplifier RDA to a detector. This relay is now held energized over a circuit including the contacts of relay 501. Switch 548 is then moved to its left hand position which prepares a circuit for the clutch magnet 547 which is later to be completed through the contacts of relay 501.

Tuning fork 523 is then set in vibration and phonic wheel motor 533 started in such a direction as to move the carriage 543 to the right. In the event that the motor 533 is started in the wrong direction to produce a movement of the carriage 543 to the right, the left hand contacts of the switch 549 will be opened, thereby opening the holding circuit for the clutch magnet 547.

The circuit of the oscillator SO is intermittently interrupted at contacts 33 and 47 of tuning fork 14, thus transmitting to line periodic impulses in accordance with the vibration of the tuning fork 14. The receipt of these impulses passed by the receiving signal detector RSA and RSD causes the periodic vibration of relay 508 which controls the energization of driving magnet 522 of the tuning fork 523. The tuning fork 523 will thus be driven in synchronism with the operation of tuning fork 14. The apparatus and circuits are now in readiness for the transmission of the picture.

To start the actual transmission of the picture key 52 is actuated which closes at its left hand contact the circuit prepared for clutch magnet 31, causing the energization and locking up of this magnet. This key also closes at its right hand contact a short circuit for the modulator PM, thereby interrupting the carrier wave transmitted to the reproducing terminal. The interruption of the carrier wave causes the deenergization of relay 501 at the receiving station due to the detector action of receiving detector amplifier RDA and in consequence the energization of clutch magnet 547. The clutch magnets 31 and 547 associated with the transmitting and receiving picture drums respectively cause these drums to be released simultaneously. Relay 501 in deenergizing opens at its contacts the holding circuit for relay 415 releasing this relay, and converting the receiving detector amplifier RDA from a detector to an amplifier.

The elemental areas of the picture of the transparency which is secured to the drum 10, are successively brought into alignment with the light source 69 and the photoelectric cell 64. Consequently, picture currents are impressed on the picture current amplifier and picture current modulators PM, to the line conductors 322 and 323, thence to the receiving amplifier RA, filter 400, receiving picture amplifier RPA, receiving detector amplifier RDA to the light valve 557. The light valve 557 is thus actuated in accordance with the received carrier wave for controlling the exposure of light sensitive surface 556 mounted on the drum 544.

As the carriage 15 moves to the right, it encounters stop switch 51 opening at its contacts the holding circuit for the clutch magnet 31 and the operating circuit of the driving magnet 34 of tuning fork 14. Stop member 30 is then positioned in the path of the stop arm 29 causing the stoppage of the shaft 18 and in consequence the drum 10 upon its engagement therewith. The tuning fork 14 is also arrested. At the reproducing terminal, the carriage 543 engages the first switch member of stop switch 550 opening the energizing circuit of clutch magnet 547, and accordingly the stoppage of the drum 544. The light sensitive surface 556, having been exposed in accordance with the operation of the light valve 557 which responds to the carrier wave impressed thereon, may now be removed from the drum 544 and developed in the usual method employed in photography.

The invention has been described with reference to a particular type of system, although obviously it may be applied to other systems for the transmission of pictures by electricity without departing from the spirit and scope of the present invention. It is therefore not intended that the invention should be limited to the particular system chosen for illustration but only by the appended claims.

What is claimed is:

1. In a picture transmission system, a transmitting and a reproducing station, means at the transmitting station for transmitting picture characteristics as an electric wave, means at the reproducing station responsive to the wave for controlling the reproduction of the picture, means associated with said transmitting means for testing the operation thereof, a signaling device, and means at said reproducing station for also causing the operation of said testing means for controlling the operation of said signaling device.

2. In a picture transmission system, a transmitting and a reproducing station, means at the transmitting station for transmitting the picture characteristics as modulations of a carrier wave, means at the reproducing station responsive to said carrier wave for controlling the reproduction of the picture, means at the transmitting station including an electron discharge device for testing the operation of the transmitting means, a signaling device, and means at the reproducing station for impressing on said testing means a special signal for controlling the operation of said signaling device.

3. In a picture transmission system, a transmitting and a reproducing station, means at the transmitting station for transmitting the picture characteristics as modulations of a carrier current wave, means at the reproducing station responsive to the carrier current wave for controlling the reproduction of the picture, current responsive means at the transmitting station for determining the contrast between the dark and light shades of the picture, a signaling device also controlled by said current responsive means, and means at the reproducing station for impressing a special signal on said current responsive means to cause the operation of said signaling device.

4. In a picture transmission system, a transmitting and a reproducing station, means at the transmitting station for transmitting the picture characteristics as modulations of a carrier wave, means at the reproducing station responsive to the carrier current waves for controlling the reproduction of the picture, current responsive means including an electron discharge device at the transmitting station, an indicating and a signaling device controlled thereby, means for associating said current responsive device with the several points of connection of said transmitting means for testing the operation thereof by means of said indicating instrument, and means at the reproducing station for impressing on said current responsive means a special signal of a predetermined frequency for controlling the operation of said signaling device.

5. In a picture transmission system, a transmitting and a reproducing station, means at the transmitting station for transmitting the picture characteristics as modulations of a carrier current wave, means at the reproducing station responsive to the carrier current wave for controlling the reproduction of the picture, current responsive means including an electron discharge device at the transmitting station, means for associating said current responsive means with said circuits and apparatus composing said transmitting means, an indicating instrument associated with said current responsive means and operated in accordance therewith, means at the reproducing station for impressing on said current responsive means a current frequency differing from the carrier wave transmitted from the transmitting station, and a signalling device controlled by said current responsive means for producing a signal in accordance with the current impressed thereon from the reproducing station.

6. In a picture transmission system, a transmitting station and a reproducing station, means at the transmitting station for transmitting the picture characteristics as modulations of a carrier current wave, means at the reproducing station, responsive to the carrier current wave for controlling the reproduction of the picture, a testing system associated with said transmitting means comprising an electron discharge device, an indicating instrument, means for associating said testing system with the various parts of the transmitting means for rendering said indicating instrument responsive to the testing currents, an interrupter at the reproducing station operative to generate a predetermined current frequency, means for rendering said interrupter effective, means at the transmitting station for impressing the current frequency generated by said interrupter on said electron discharge device of the testing system, and a signaling device responsive in accordance with the current detected by said electron discharge device.

7. In a system for the transmission of pictures by electricity, a photoelectric cell exposed to light intensity corresponding to the tone values of the elemental areas of a picture to be transmitted, a modulator coupled to said cell for producing a voice frequency carrier wave modulated in accordance with current flowing in said cell, an electron discharge amplifier for raising the current level received from said modulator to a value equal to that employed for ordinary telephone transmission, a voice frequency telephone channel over which the amplified modulated carrier wave is transmitted, an electron discharge detector associable with the several parts of the transmitting system, an indicating instrument responsive to the operation of said detector, picture reproducing means for reproducing the picture in accordance with the transmitted currents, means at the reproducing station for impressing on said telephone channel a current of a predetermined frequency, means at the transmitting station for impressing said current frequency on said electron discharge detector, and a signaling device controlled by the detected current.

In witness whereof, I hereunto subscribe my name this 6th day of February, A. D. 1925.

DONALD M. TERRY.